United States Patent [19]

Hansson et al.

[11] Patent Number: 4,689,374

[45] Date of Patent: Aug. 25, 1987

[54] WATER SOLUBLE POLYAMIDOAMINEPOLYAMINE HAVING WEIGHT AVERAGE MOLECULAR WEIGHT OF AT LEAST $5 \times 10^5$

[75] Inventors: Per E. A. Hansson, Helsingborg, Sweden; Felek Jachimowicz, Columbia, Md.

[73] Assignee: W. R. Grace & Co., New York, N.Y.

[21] Appl. No.: 845,485

[22] Filed: Mar. 28, 1986

Related U.S. Application Data

[63] Continuation of Ser. No. 640,389, Aug. 13, 1984, abandoned, which is a continuation of Ser. No. 502,551, Jun. 9, 1983, abandoned.

[51] Int. Cl.[4] .................. C08G 69/48; C08G 69/26
[52] U.S. Cl. .................. 525/435; 162/164.3; 162/164.6; 525/423; 525/430; 528/342
[58] Field of Search .......... 525/435, 430, 423; 528/342

[56] References Cited

U.S. PATENT DOCUMENTS

| | | | |
|---|---|---|---|
| 2,926,116 | 2/1960 | Keim | 162/164 |
| 2,926,154 | 2/1960 | Keim | 260/29.2 |
| 3,275,588 | 9/1966 | Garms | 260/29.2 |
| 3,329,657 | 7/1967 | Strazdins et al. | 260/78 |
| 3,442,754 | 5/1969 | Espy | 162/164 |
| 3,609,126 | 9/1971 | Asao et al. | 260/78 |
| 3,617,440 | 11/1971 | Strother | 162/168 |
| 3,640,840 | 2/1972 | Zieman et al. | 525/430 |
| 3,642,572 | 2/1972 | Eadres et al. | 162/164 |
| 3,775,379 | 11/1973 | Hausslein et al. | 260/78 |
| 3,793,279 | 2/1974 | Lipowski | 525/430 |
| 3,893,885 | 7/1975 | Ziemann et al. | 162/164 |
| 4,066,494 | 1/1978 | Scharf et al. | 162/164 |
| 4,093,605 | 6/1978 | Hoppe et al. | 525/430 |
| 4,144,123 | 3/1979 | Scharf et al. | 162/164 |
| 4,250,299 | 2/1981 | Lehmann et al. | 528/310 |

FOREIGN PATENT DOCUMENTS 002475 8/1981 European Pat. Off. .

*Primary Examiner*—Harold D. Anderson
*Attorney, Agent, or Firm*—Howard J. Troffkin

[57] ABSTRACT

A product formed by reacting a polymeric polyamidoamine with a low molecular weight polyamine under reactions conditions to cause transamidation and then further reacting the transamidation product with a compound which is polyfunctional with respect to amino groups present in the transamidation product. The resultant material is useful in paper making processes as a retention and drainage aid.

21 Claims, No Drawings

WATER SOLUBLE POLYAMIDOAMINEPOLYAMINE HAVING WEIGHT AVERAGE MOLECULAR WEIGHT OF AT LEAST $5 \times 10^5$ This is a continuation of application Ser. No. 640,389, filed Aug. 13, 1984, which is a continuation of application Ser. No. 502,551, filed June 9, 1983, both abandoned.

BACKGROUND OF THE INVENTION

In modern papermaking, an ever-increasing emphasis is being placed on more complete recovery of furnish materials, such as pigments, fibers and additives, as a part of the ultimate sheet. Some of the many benefits the papermaker realizes by increasing the retention, especially of the fine particulate matter associated with respect to these components, are:

(a) better economic utilization of the furnish materials. Obvious economic advantages are achieved by increasing the retention of the furnish materials on the wire of the paper-making machine to provide more paper product and less waste;

(b) improved quality of the resultant sheet product. The retention of supplied furnish material yields a more uniform grade of product and fewer rejects on the production end product;

(c) less down-time due to a cleaner system. The retenton of most of the fiber, fines, fillers and additives on the web does not allow these materials to accumulate in the recirculating white water of the production system. In systems where the white water is at least partially recirculated, this provides less build-up or concentration of fines in the head box. It also provides less solids in the effluent stream and thereby minimizes the need for extensive treatment of the stream before release;

(d) increased production. By providing a means to retain the solids on the web and provide an increased drainage rate, a paper making machine can be frequently increased in rate and thereby increase production; and (e) more versatile paper production. The ability to retain more solids on the web can often reduce two-sidedness of the paper product and provides a means of incorporating materials otherwise impossible to use.

A large variety of materials have been used as retention aids. The most widespread of these, and among the oldest in use, are the salts of aluminum, in particular aluminum sulfate, sodium aluminate and sodium phosphoaluminate. These materials, however, have the defects of being required to be used in large amounts and are known not to be a highly efficient retention aid.

Various polymeric materials, from natural occurring gums to synthetic resins have also been used as retention aids. These materials include natural and synthetic starches, anionic polyelectrolytes, such as partially hydrolyzed polyacrylamides, and cationic polymers such as polyamidoamines and polyalkyleneimines. Polyethyleneimine and, to a lesser extent, polypropyleneimine are used in the papermaking industry as retention aids for fillers and fibers, as aids for improving the drainage rate during sheet formation and as flocculants in pulp recovery. Such alkyleneimine type polymers have been known and used for a long time. More recently these polymers have been extended with epihalohydrins (See German Patent No. 1670296) or with epihalohydrin capped polyalkylene oxides (See German Published Application No. 1546290 and U.S. Pat. No. 4,066,494). The preferred materials have been those having high degrees of alkyleneimine units in the polymer.

It is also known that polyamidoamines formed from polyamines with dicarboxylic acids and subsequently crosslinked with epihalohydrin provide a good fiber retention aids. Examples of such crosslinked polyamidoamines are described in U.S. Pat. Nos. 3,250,664 and 3,893,885.

The polyalkyleneimine and polyamidoamine products described above each suffer from the drawback of being effective within a limited pH range. The former material is effective at neutral and alkaline pHs while the latter material is best used under acid pH conditions. In the manufacture of paper, the pH will vary depending on the particular type of paper being formed. For this reason it is highly desirable to have a retention agent which is capable of being used under both neutral and acid pH conditions. This requirement led to the formation of a polyethyleneimine grafted polyamidoamine copolymer, as described in U.S. Pat. No. 3,642,572. The polyamidoamine is initially formed and then an aziridine compound is grafted onto the backbone by standard cationic polymerization. Although the resultant product is useful at a wide variety of pH conditions, the product has the drawback of being formed from highly toxic aziridine compounds. The use of such monomers require special handling and apparatus which greatly increases the cost of the finished product and, indirectly, the cost of the paper product.

Another means of attempting to achieve a product which is effective at a variety of pH conditions is to couple together polyamines and polyamidoamines with the aid of a poly functional compound as described in U.S. Pat. No. 4,250,299. Although the polyamidoamines have moderate molecular weight, the polyamines are generally low molecular weight material. The polyfunctional compounds taught useful are those capable of reacting with secondary and/or tertiary amino groups present in the polyamidoamine (by its formation from a dicarboxylic acid with an amine required to have at least two primary *and* at least one secondary and/or tertiary amino group) and with such groups present in the polyamine. Although this process alleviates the need for aziridine as a means to provide alkyleneimine polymeric segments in the final product (as described in U.S. Pat. No. 3,642,572), it produces high percentages of low molecular weight material as part of the final product. Such low molecular weight material is formed by the preferential coupling (due to high molar ratio of reactive amino groups in the polyamine in comparison to the low presence of such groups in the polyamidoamine) of low molecular weight polyamines together. Even where there is sequential addition of the components, the polymeric product still has a high percentage of low molecular weight material. Products formed according to '299 have been found to be less effective on a dosage weight basis than other known retention and drainage agents, such as those of '572. This is probably due to the high percentage of low molecular weight material present in the former material.

It is highly desired to have a material which is capable of exhibiting a high degree of retention of fibers, fillers, and pigments in the manufacture of paper, for accelerating the dehydration of paper raw materials, and for working-up waste water from paper machines. The desired material must be capable of exhibiting these properties over a wide variety of pH conditions, be capable of being formed from materials easily handled and obtained, and be capable of being of a substantially high molecular weight.

Summary of the Invention

A product capable of exhibiting a high degree of retention of fibers, fillers and pigments on the screen of a paper making machine over a wide pH range, and causing accelerated dehydration of the paper raw material.

A polymeric polyamidopolyamine formed by transamidation of a preformed polyamidoamine with a polyamine at a temperature of at least 150° C. and under substantially anhydrous conditions to cause substantially complete reaction of the polyamidoamine and polyamine. The polymeric transamidation product is subsequently crosslinked to form a high molecular weight, water-soluble product capable of providing the desired properties.

DETAILED DESCRIPTION OF THE INVENTION

The present invention requires the utilization and interaction of certain materials as more fully disclosed hereinbelow. To aid in the description of the invention, the following are brief definitions of terms used in the specification and in the appended claims.

"Polyamine" is an organic compound of low molecular weight having a plurality of primary amino groups. In addition the compound may contain one or more secondary and/or tertiary amino groups.

"Polycarboxylic acid" refers to organic compounds of low molecular weight containing a plurality of at least two carboxylic acid groups.

"Polymeric polyamide" or "Polyamidoamine" is a polymeric organic material formed from the condensation of a polycarboxylic acid and a polyamine alone or, in addition with an aminocarboxylic acid compound. The condensation product has a plurality of amido and, in addition may have a plurality of tertiary and/or secondary amino groups.

"Transamidation" is the reaction between an amide group containing compound and a primary or secondary amino group containing compound requiring the cleavage of the nitrogen-carbonyl carbon bond of the amide and the formation of a nitrogen-carbonyl carbon bond using the primary or secondary amino group containing compound. As used herein, it refers to the reaction between a polymeric polyamidoamine and a polyamine. See further discussion hereinbelow.

"Transamidation product" is the polymeric reaction product formed by transamidation between at least one polymeric polyamidoamine and at least one polyamine wherein the polyamine is incorporated into the polyamidoamine structure.

"Polymeric Polyamidopolyamine" or "Polyamidoaminepolyamine" refers to a high molecular weight crosslinked product of a transamidation product and a compound having a plurality of groups which are reactive (capable of forming covalent bonds) with the amino groups of the transamidation product.

The above terms will be more fully described hereinbelow with reference to the present invention.

The present invention provides a product having usefulness as a retention and drainage aid in paper making processes which is formed by transamidation of polymeric polyamidoamines with a low molecular weight polyamines and then extending the transamidation product with a polyfunctional agent to form a high molecular weight product capable of exhibiting a high charge density and having a low distribution of low molecular weight material.

In the amidation of a carboxylic acid, a primary amine acts as a nucleophilic reagent. Similarly, in an ammonolysis reaction, an amine acts as a nucleophilic reagent attacking the electron-deficient carbonyl carbon. With this information, it can be seen that one amine is capable, under certain conditions, of displacing another amine from the amide group to form a distinctly new amide group. This cleavage of amido group and formation of a new amido group when done by a different amine is known as transamidation. When done between a single amide containing compound and a single amine containing compound (different from the amide's amine component), the equilibrium reaction is:

in an analogous manner to transesterification.

In the present transamidation, the transamidation product is a mixture of polymeric material formed by cleavage of at least one amido group of a polymeric polyamidoamine and formation of an amido group with a polyamine moiety. The transamidation reactions (in a simple manner) which are occurring are:

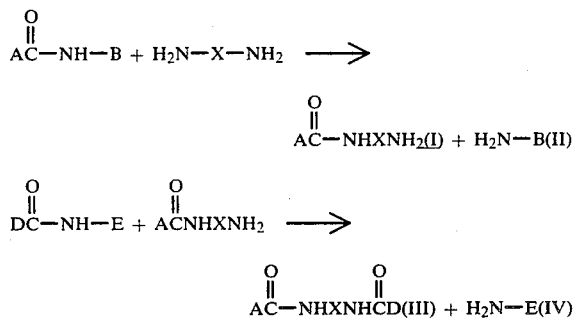

wherein A, B, D and E each represent a polymeric chain segment of a polyamidoamine structure and X represents a low molecular organic chain, such as alkylene, alkyleneimine, etc. capable of linking primary amine groups. It can be seen that each of the products is a polymeric polyamidoamine and that products I and III have taken up the polyamine and incorporated it into polymer structures. The polymeric polyamidoamines II and IV can also further react with other polymeric polyamidoamines and/or polyamines contained in the reaction zone in similar manners to provide additional transamidation products.

The polymeric polyamidoamines used as a starting material for the transamidation can be obtained by condensation of aromatic or aliphatic dicarboxylic acids with a polyamine containing at least two amino groups each selected from primary and secondary amino groups and, optionally, also with a small amount of an omega-aminocarboxylic acid or its lactam. The molar ratio of dicarboxylic acid to polyamine can be from about 1:0.8 to 1:1.5 and preferably from about 1:0.9 to 1:1.2. The condensation is carried out in conventional manners at elevated temperatures with the water formed being removed.

A. The polymeric polyamidoamines are the reaction products obtained from (a) at least one aliphatic, cycloaliphatic, araliphatic or heterocyclic (preferably aliphatic) polyamine containing at least two amino groups each selected from primary and secondary amino groups. The polyamine may contain just two primary amino groups or just two secondary amino groups or just one primary and one secondary amino group. It is preferred that the polyamine have at least two primary amino groups therein. Examples of such polyamines include aliphatic, cycloaliphatic, araliphatic or heterocyclic (preferably aliphatic) amines having two amino groups, each selected from a primary or secondary type such as, for example, ethylenediamine, propylenediamine, 1,5-pentanediamine, 1,2-propanediamine, 1,2-butanediamine, 1,6-diaminohexane, 1,4-diaminocyclohexane, 1,3-bis-aminomethylbenzene, o-phenylenediamine, piperazine, N-(2-hydroxy-ethyl)-ethylenediamine, N,N'-dimethyl-ethylenediamine, and the like. The polyamine may contain additional primary and/or secondary amino groups and also tertiary amino groups. Examples of such polyamines are methyl-bis-(3-aminopropyl)amine, ethyl-bis-(3-aminopropyl)amine, 2-hydroxyethyl-bis-(3-aminepropyl)amine, N-(3-aminopropyl)tetramethylenediamine and N,N'-bis-(3-aminopropyl)tetramethylenediamine, 3-(2-aminoethyl)aminopropylamine, N,N'-bis-(3-aminopropyl)ethylenediamine, 1,6-bis-(2-aminoethylamino)hexane, 3-(3-diethyl-aminopropylamino)-propylamine, tris-(3-aminopropyl)amine, N,N'-bis(3-aminopropyl)-1,3-diaminomethyl-benzene and N-(2-aminoethyl) piperazine.

The preferred polyamines are aliphatic polyamines of low molecular weight having the general formula:

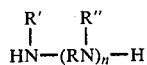

in which R represents a $C_2$ to $C_8$, most preferably a $C_2$–$C_3$ alkylene group, R' and R" independently represent hydrogen or a $C_1$–$C_{10}$ alkyl radical which may be substituted by hydroxy or amino group, most preferably hydrogen and n represents an integer from 1 to 5. Such polyamines are readily formed in known manners which do not require the use of ethyleneimine as a starting material, as for example, by the reaction of an alpha, omega-dihaloalkane with ammonia. The most preferred polyamines are diethylenetriamine and triethylenetetramine.

The above polyamines can also be used in combination with omega-aminocarboxylic acids or their lactams such as, for example, 6-aminocaproic acid, 8-aminocaprylic acid, 6-caprolactam or 8-capryllactam. The amine containing compounds alone or in combination with aminocarboxylic acids may be present in a molar ratio based on the above-described polyamine, of up to about 0.2.

(b) A saturated or unsaturated aliphatic or aromatic (preferably aliphatic) dicarboxylic acids having from 4 to 10 carbon atoms or their functional equivalents. The preferred dicarboxylic acids are saturated aliphatic dicarboxylic acids and in particular $C_4$–$C_8$ saturated aliphatic dicarboxylic acids. Examples of useful dicarboxylic acids include saturated gloxalic succinic, glutaric, adipic, pimelic, suberic azelaic and sebacic acids as well as the unsaturated maleic, fumaric, and glutaconic acids as well as the aromatic phthalic, isophthalic and terephthalic acids.

The polyamidoamine is formed from reactants (a) and (b) by conventional methods normally using elevated temperatures with the reactants neat or with an organic liquid capable of aiding in the azeotropic removal of the water which is formed. The polyamidoamine formed should have a weight average molecular weight of from about 3,000 to 60,000, preferably from about 5,000 to 60,000. The number average molecular weight should be from 1,000 to 5,000, preferably 1,000 to 3,000.

B. The second material used in forming a transamidation product is a polyamine selected from poly ($C_2$–$C_3$) alkylene polyamines, preferably polyethylenepolyamines. Examples of such polyamines are triethylenetetramine, tetraethylenepentamine, tetrapropylenepentamine, pentaethylenehexamine, pentapropylenehexamine, hexaethyleneheptamine, hexapropyleneheptamine and higher polyethylenepolyamines and polypropylenepolyamines and the like and mixtures of such polyamines. The polyamines are required to have at least two primary amino groups which are capable of forming amides. The preferred alkylene bridge is ethylene. The molecular weight of the polyamine should be from about 150 to 3,000 and most preferably from about 300 to 2,000. Such polyamines are readily formed by the reaction of 1,2-dichloroethane or 1,3-dichloropropane with ammonia.

The polyamine can also be readily formed by reacting in known manners a low molecular weight amine such as ammonia, a monoamine, a diamine, triamine, tetramine or pentamine with a polyfunctional agent with respect to amine, such as epihalohydrin or with an alpha, omega-dihaloalkane such as dichloroethane or dichloropropane to obtain a low molecular polyamine. The preferred agent is an epihalohydrin (most preferred being epichlorohydrin). The low molecular weight amines used to react with a polyfunctional agent to form polyamines for subsequent reaction with the polyamidoamine described above can be, for example, ammonia, a monoalkyl($C_1$–$C_2$ preferred) monoamine, ($C_2$–$C_3$) alkylene diamine, di-($C_2$–$C_3$) alkylenetriamine, tri($C_2$–$C_3$)alkylenetriamine, or tetra ($C_2$–$C_3$)alkylenepentamine and the like and mixtures thereof. By reacting these low molecular weight amines with a polyfunctional agent one attains a polyamine of a desired molecular weight as described below without the necessity of using aziridine or its equivalent. The polyfunctional agent should substantially completely react with the polyamine to produce a polyamine B which is then used to form the transamidation product as described hereinbelow. The ratio of the amino nitrogen atom in the low molecular weight amine to the polyfunctional agent should be from about 0.5:1 to 30:1, preferably from 1:1 to 20:1 and most preferably from 2:1 to 15:1 such as to produce a polyamine of low molecular weight ranging from about 150 to 3,000 and preferably from about 300 to 2,000.

The preferred material of polyamine B is formed from a low molecular weight polyamine such as diethylenetriamine, triethylenetetramine or tetraethylenepentamine with epichlorohydrin in a 1:1 to 3:1, preferably 2:1, molar ratio by contacting them at moderate temperatures such as of from about 30° C. to 100° C. for short periods of time to cause substantially complete reaction of the epihalohydrin with the low molecular weight polyamine. The completion can be monitored in known manners such as by gas chromatography.

In some cases it is advantageous if a proportion of the polyamine B employed is replaced by other types of diamines, triamines, tetramines, pentamines or hexamines as, for example, by amines of the formula

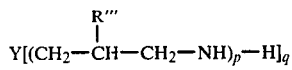

in which Y represents oxygen, sulphur or the radical of an at least difunctional aliphatic, cycloaliphatic, araliphatic or aromatic compound containing hydroxyl groups and/or sulphhydryl groups, R''' denotes hydrogen or the methyl group, p is an integer from at least 1, preferably 3 to 10, and q represents an integer from at least 2, preferably 2-4.

Examples of representatives of these polyamines are bis-(3-aminopropyl) ether, bis-(3-aminopropyl) sulphide, ethylene glycol bis-(3-amino-propyl) ether, dithioethylene glycol bis-(3-aminopropyl) ether, neopentylene glycol bis-(3-amino-propyl) ether, hexahydro-p-xylylene glycol bis-(3-aminopropyl) ether and hydroquinone bis-(3-aminopropyl) ether and the like as well as amines of the formula

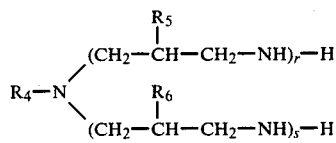

in which $R_4$ represents a $C_1$–$C_{18}$ alkyl radical which is optionally substituted by an amino or hydroxyl group, $R_5$ and $R_6$ independently of one another represent hydrogen or a methyl group and r and s is a number from 1 to 20, preferably 2 to 5.

Examples of representatives of these polyamines are ethyl-bis-(3-amino-propyl)-amine, 2-hydroxyethyl-bis-(3-amino-propyl)-amine, n-butyl-bis-(3-amino-propyl)-amine, tris-(3-amine-propyl)-amine and, above all, methyl-bis-(3-amino-propyl)-amine.

The polyamidoamine A and the polyamine B must be contacted under reaction conditions which cause transamidation to occur. It has been found that the transamidation equilibrium reaction of a polyamidoamine and a polyamine is directed to the right only at elevated temperatures of 150° C. or greater. The reaction temperature must therefore be carried out at at least 150° C. and preferably of at least about 160° C. Temperatures below this will not cause transamidation to occur. The upper temperature is limited only by the particular polyamine used and to temperatures which do not cause degradation of the transaminated product. Normally, the reaction is carried out at temperatures of from 150° C. to 250° C. and preferably from 160° C. to 200° C.

The transamidation reaction between the polyamidoamine and the polyamine must be done under substantially anhydrous conditions. The reaction can be carried out in an inert organic liquid such as benzene, toluene, hexane and the like. Where the polyamidoamine is formed in the presence of an organic liquid, the same liquid (after water has been removed) may be used for the transamidation reaction. The presence of such liquids may require pressurized conditions. The reaction can also be carried out under substantially neat conditions by mixing the polyamine with the polyamidoamine at the elevated temperatures described above.

In order to produce a transamidation product in which the polyamines are transformed into being part of a polymeric chain of the polyamidoamine or polyamide as may be the case, one must use molar ratio of polyamidoamine to polyamine of at least 2.5:1 and preferably at least about 3:1. The polymeric product must contain therein substantially all of the short chains of the polyamine. The molar ratio of polyamidoamine to polyamine should be at least about 2.5:1 with from 3:1 to 10:1 preferred and from 3:1 to 5:1 most preferred. Although the structure of the starting polyamidoamine and polyamine may permit otherwise, it is normally found that ratios higher than 10:1 produce a product with insufficient polyamine segments incorporated into the transamidation polymer product and therefore such higher ratios are not desired. Lower ratio than 2.5 causes excessive cleavage of the polyamidoamine chain to produce a transamidation product of undesired low molecular weight.

Polyamidoamines of the present invention used to form transamidation products are required to have the presence of amido nitrogen-carbon bond to be the reaction sites by which a polyamine is made part of the polymer chain when subjected to the above reaction conditions. The polyamidoamine of the present invention may therefore be, as described above, a condensation product of a polycarboxylic acid and a polyamine having only one pair of amino groups selected from primary and/or secondary amino groups. Such resultant polyamides are thereby substantially free of secondary and tertiary amino groups, which groups are required as reaction sites by the prior art for subsequent graft polymerization of aziridine to polymeric polyamidoamines, as described in U.S. Pat. No. 3,642,572, or for coupling of polyamines to polyamidoamines, as described in U.S. Pat. No. 4,250,299 via a compound capable of reacting with the amino groups in each constituent.

The transamidation product can be advantageously formed by transferring the polyamine to the reaction vessel in which the polyamidoamine condensation product was formed. The transamidation reaction is carried out for a period of time sufficient to cause all of the polyamine to be covalently bonded to a polyamidoamine by the formation of at least one new amido group. This can be readily determined by gel permeation chromatography.

The weight average molecular weight of the transamidation product should be about 2,000 to 60,000 and therefore is made up of polymeric chains without substantially any unreacted polyamine residue.

The transamidation product is next reacted with a compound which is polyfunctional to the amino groups present in the transamidation product. Compounds which are polyfunctional towards amino groups and are suitable for the preparation of the high molecular weight polyamidoaminepolyamines of the present invention are, in particular, those polyfunctional compounds which, in aqueous solution at pH values above 6, preferably above 8, are able to react completely with the amino groups contained in the basic transamidation product.

Examples which may be mentioned of compounds which are polyfunctional towards amino groups are a,w-alkyl dihalides, for example, in particular, 1,2- dichloroethane, 1,2-dibromoethane, 1,2-dichloropropane, 1,3-dichloropropane and 1,6-dichlorohexane; w,w'-dihalogeno-ethers, for example 2,2'-dichlorodiethylether, bis-(B-chloroisopropyl)ether and bis-(4-chloro-butyl)ether; halogenohydrins and epihalohydrins, for example epichlorohydrin, 1,3-dichloropropan-2-ol, bis-(3-chloro-2-hydroxypropyl) ether and 1,4-di-chloro-2,3-epoxy-butane; bis-epoxy compounds, for example 1,2,3,4,-diepoxybutane, diglycidyl ether, ethane-1,2-bis-glycidyl ether and butane-1,4-bis-glycidyl ether; w-halogenocarboxylic acid halides, for example chloroacetyl chloride, 2-chloropropionyl chloride, 3-chloropropionyl chloride and 3-bromopropionyl bromide; vinyl compounds, for example divinyl ether, divinyl sulphone and methylene-bis-acrylamide; and furthermore 4-chloromethyl-1,3-dioxolane-2-one and chloroformic acid 2-chloroethyl ester, and also chloroformic acid esters, 3-chloro-2-hydroxypropyl ethers; and diglycidyl ethers of polyalkylene oxides, for example polyethylene oxides, as well as of reaction products of 1 to 50 mols of alkylene oxides, such as ethylene oxide and/or propylene oxide, with 1 mol of dihydric or polyhydric polyols or of other compounds containing at least two active hydrogen atoms; and trifunctional compounds, such as 1,3,5-triacryloylhexahydro-s-triazine. The preferred compounds are the epihalohydrins and the diglycidyl ethers of polyalkylene oxides.

The amine nitrogens of the transamidation product and the polyfunctional agent are used in a molar ratio of from about 0.03 to 0.5 with from about 0.05 to 0.3 being preferred. By starting with a polymeric transamidated product and by using the above amount of polyfunctional agent one obtains a polyamidoaminepolyamine product of high weight average molecular weight of at least $5 \times 10^5$ and preferably of at least $10^6$ with low amounts of low molecular weight material therein. The polyamidoaminepolyamine is water soluble and is useful as a retention and drainage agent for paper making processes.

The polyamidoaminepolyamine product which is most preferred is a product formed according to the description herein above and which is further treated to substantially remove the segment of the product which is of lower molecular weight, that is to substantially completely remove product which has weight average molecular weight of less than $10^5$ and most preferably less than $5 \times 10^5$. The lower molecular weight material can be separated from the high molecular weight product and removed by known means, such as, for example by ultrafiltration using a hollow fiber cartridge filtration of a predetermined filtration capability (such as HIP 100-43 sold by Amicon, Inc.), fractionation, gell permeation chromotography and the like means. The resultant product will be substantially free of polymer product having a weight average molecular weight lower than $10^5$ and, preferred, below $5 \times 10^5$ and, most preferred, to be substantially absent of material of molecular weight below $10^6$.

The process for forming the preferred high molecular weight polyamidoaminepolyamine product requires the passing of the material through a separating means as described above. The low molecular weight material can be returned to the reaction zone where the transamidation product is reacted with a polyfunctional compound as described above. It has been found that recycling of the separated lower molecular weight component causes increased yield of high molecular weight product and thus improves the overall economy of the resultant product.

When using the polyamidoaminepolyamines formed according to the present invention as agents for increasing the retention of fibers, fillers and pigments and as drainage accelerators, the procedure followed is in itself known and is to add the polyamidoaminepolyamines according to the invention, in the form of dilute aqueous solutions, to the paper-pulp suspension before the head box. The metering point is chosen so that good distribution of the agent in the suspension of the raw materials is ensured but that too long a contact time is avoided. The amounts of polyamidoaminepolyamines which are necessary to produce the desired retention action and/or drainage accelerating action can be determined without difficulty by preliminary experiments in standard manners known to the artisan. In general, it is advisable to use 0.005 to 0.5 percent by weight of the polyamidoaminepolyamines with respect to the dry weight of the paper. Addition of the polyamidoaminepolyamine product according to the invention before the head box of the paper machine also has an advantageous effect on the working up of the effluents from the paper machine by filtration, flotation or sedimentation; the coagulating action of the product according to the invention very considerably facilitates the separation of pulp constituents from the effluent from the paper machine.

When the polyamidoaminepolyamine according to the invention are used as agents to aid in the working up of the effluents from paper machines by filtration, flotation or sedimentation, the procedure which can be followed is also in itself known. It is preferable to add the products concerned, in the form of dilute aqueous solutions, to the effluent from the paper machine, appropriately before entry into the save-all. The amounts of polyamidoaminepolyamine which effect adequate coagulation of the paper pulp constituents contained in the effluents from paper machines are to be calculated according to the composition of the effluents and can easily be determined from case to case by preliminary experiments. In general, amounts of 0.005 to 2 g of polyamine per m$^3$ of effluent are adequate for this purpose.

The following examples are given for illustrative purposes only and are not meant to be a limitation on the subject invention except as defined by the claims appended hereto. All parts and percentages are by weight except where specifically defined otherwise.

Gell permeation chromatography or size exclusion chromatography used hereinbelow is a standard analytical technique used to separate and determine molecules by size. The column packing was TSK-GEL-PW (Beckman Instruments Inc., Catalog No. 7699B) which was found useful in determining molecular weights of water-soluble polyelectrolytes without ionic interaction.

The evaluation of retention capability was conducted on various products described hereinbelow using the Britt's Dynamic Drainage Jar and standard procedures for the test (*Dynamic Drainage Jar Information Manual*, Paper Research Materials Co., Syracuse, N.Y.). The lower the solid content in the drained water indicates improved performance as a retention agent.

Preparation of Polyamidoamine

A. 388.1 parts of diethylenetriamine were added to a flask equipped with a condenser, thermometer, gas inlet tube and stirrer. 550.2 parts of adipic acid (molar ratio of diethylenetriamine to adipic acid of 1:1) and 20 parts of water were added to the flask with stirring. The mixture was then heated to 140° C. over a 45 minute period and then maintained at 140° C. for an additional 45 minutes with water refluxing. In the presence of nitrogen atomosphere, the mixture was then heated to 170° C. over a 2.5 hour period and then maintained at 170° C. for about 2 hours while distilling off 139.4 ml of water. The reaction was cooled and the formed polyamidoamine condensation product was an orange color resinous material having a weight average molecular weight ($M_w$) of 27,000 g/mol and a number average molecular weight ($M_n$) of 2,200. This is labeled PA-1.

B. 57.9 gm of diethylenetriamine were reacted with 91.2 gm of adipic acid (0.9:1 molar ratio) using 5 ml of $H_2O$ as part of the initial feed. The react was run substantially as described in Part A above except that the materials were heated for 1 hour at 170° C. 25.7 ml of water was collected. The product was a thick orange colored resin. The weight average molecular weight of the polyamidoamine was 675,000 and a number average molecular weight of 2,800. The $M_w$ is probably not a true description of the polymer's molecular weight as there was a high degree of ionic interaction between the excess carboxylic acid groups with the amino groups. The actual molecular weight was substantially lower. This is labeled PA-2.

Polyamine

Polyamines used as a reactant for the transamidation reaction were commercially obtained low molecular weight tetraethylenepentamine, a mixture of homologs of alkyleneamines, and a low molecular weight reaction product of tetraethylenepentamine and epichlorohydrin formed in the following manner:

177 gm of tetraethylenepentamine were placed into a 500 ml flask equipped with a condenser, thermometer and stirrer. The material was heated to 70° C. and then 43.1 gm of epichlorohydrin was introduced over a half hour period while maintaining the temperature at 70° C. The reaction was continued at 70° C. and the consumption of the epichlorohydrin was monitored by gas chromatography. When the epichlorohydrin was totally consumed (about 1 hour) the reaction product was cooled to room temperature. The product was a thick orange colored material and had an $M_w$ and $M_n$ (by gel permeation chromatography) of 1430 and 670, respectively.

Transamidation Product 858 gm of the polyamidoamine A above was placed in a 3 neck flask equipped with a stirrer and thermometer and heated to about 140° C. 230.35 gm of the tetraethylenepentamine/epi reaction product described above was introduced into the flask over a 20 minute period. The material was heated to 170° C. and maintained at that temperature for 1.0 hour to ensure complete reaction between the materials. To terminate the reaction, 1030 gm of water was added and the reaction cooled to ambient temperatures. The product had an $M_w$ and $M_n$ (by gel permeation chromatography) of 21,000 and 1,560, respectively.

In the same manner as described above transamidation products were made using the polyamidoamine A and the polyamidoamine B, respectively, with each of the following polyamines: tetraethylenepentamine (TEPA), tetraethylenepentamine/epichlorohydrin (TEPA/EPI), and a mixed polyethyleneamine having an average molecular weight of 300 (P-300). Each of the resultant products was analyzed and determined not to have any low molecular polyamine material present. The $NW_w$ of each of the products is given in Table I below:

TABLE I

| Polyamidoamine | Polyamine | Transamidation Product | |
|---|---|---|---|
| | | $M_w$ | $M_n$ |
| PA-1 | TEPA | 2,000 | 860 |
| PA-1 | TEPA/EPI | 21,000 | 1,560 |
| PA-2 | TEPA | 8,500 | 1,400 |
| PA-2 | TEPA/EPI | 12,000 | 1,400 |
| PA-2 | P-300 | 31,000 | 1,600 |

Polyamidoaminepolyamine

The transamination product prepared from polyamidoamine A with the polyamine product of tetraethylenepentamine/epichlorohydrin as described above was reacted with polyfunctional agents to form high molecular weight polyamidoaminepolyamine products in the manners described below:

A. 939 gm of transaminated product were placed into a 3 l flask with 1534 gm water and 47.6 gm epichlorohydrin. The mixture was heated to 70° C. and maintained at that temperature with stirring for a period of 10 hours. The Brookfield viscosity of the aqueous solution (20.3% solids, C-1 spindle) at 25° C. was 163 cp. The molecular weight of the product was analyzed by gel permeation chromatography. It was determined that the product had a $M_w$ of $7 \times 10^6$ and an $M_n$ of 3,000 and had a molecular weight distribution which shows that the product contained a low percentage of low molecular weight material. This product is labeled PAAPA-1. The results are given in Table I below and are compared with a commercially obtained product of a cross-linked polyethyleneimine grafted polyamidoamine (labeled PAAPEI-SN). Both products show high distribution of high molecular weight material.

B. A different sample of the transamidation product used above was reacted with a diglycidyl ether of polyethylene glycol to form a polyamidoaminepolyamine product.

The diglycidyl ether of polyethylene glycol was prepared by adding 250 gm of a commercially obtained polyethylene glycol ($M_w = 1,000$) to a 500 ml reaction vessel equipped with a thermometer, stirrer, and addition funnel. 5 gm of epichlorohydrin was added to the vessel and then it was heated to 70° C. While maintaining the temperature at 70° C., 0.3 ml of $BF_3(C_2H_5)_2O$ was added to the vessel and then 45 gm of epichlorohydrin was added dropwise over a 1 hour period. The reaction was run for 6 hours at 70° C. and then cooled to room temperature. The product was analyzed by gas chromatography method and found to be free of unreacted epichlorohydrin.

270 gms of the formed diglycidyl ether of polyethylene glycol was added to a reaction vessel containing 608.7 gm of transamidation product and 1971 gm of water. The mixture was heated to 70° C. and maintained at that temperature, with stirring, for 21 hours until the Brookfield viscosity (19.2 % solid solution, C-1 spindle) at 25° C. was 127 cp. This polyamidoaminepolyamine product had substantially the same molecular weight characteristics as described in Table II for PAAPA-1.

TABLE II

| Sample | $M_n$ (g/mol) | $M_w$ (g/mol) | % Material as Function of Molecular Weight (gm/mol) | | | | |
|---|---|---|---|---|---|---|---|
| | | | $3.7 \cdot 10^6$ | $10^5 - 3.7 \cdot 10^6$ | $10^4 - 10^5$ | $10^3 - 10^4$ | $10^3$ |
| PAAPA-1 | 3,000 | $7 \times 10^6$ | 25.0 | 21.0 | 17.0 | 26 | 10 |
| PAAPEI-SN | 4,300 | $5.2 \times 10^6$ | 22 | 22 | 21 | 27 | 8 |

Polyamidoaminepolyamine products (PAAPA) formed in the manner described hereinabove (using epichlorohydrin "EPI" and using diglycidyl ether of polyethylene glycol "PEG/EPI") were tested in production runs on a paper machine having a capacity of 300 kg paper per hour, speed of 100 m/min, recycling of white water at the rate of about 75 percent. The pulp was 100% softwood sulfite pulp, 350 ml CSF and 10% clay. The retention capabilities were evaluated in standard manners for total first pass retention (FPR-T) and for first pass retention of fines and clay (FPR-F) at two add on levels. The results are given below in Table III.

TABLE III
RETENTION CAPABILITIES ON PAPER MACHINE

| | FPR-T add on level[1] | | FPR-F add on level[1] | |
|---|---|---|---|---|
| Sample | 0.05 | 0.15 | 0.05 | 0.15 |
| Blank | | 69.5 | | 42.7 |
| PAAPA-1 | 91.4 | 89.8 | 77.5 | 74.5 |
| PAAPA-2 | | 94.8 | | 86.6 |
| PAAPEI-SN[2] | 87.3 | 91.4 | 69.0 | 77.7 |

[1] Add on level is weight percent dry polymer based on pulp.
[2] A commercial cross-linked polyethyleneimine grafted polyamidoamine - for comparative purposes.

A series of retention drainage determinations were conducted using the Britt's Dynamic Drainage Jar test procedure at varying pH conditions with respect to the polyamidoaminepolyamine product of the present invention formed from the transamidation product described above with epichlorohydrin. The tests were conducted with 100% sulfite softwood, 5% clay, consistency of 0.35%, fines content of 19% and speed of 700 rpm. The total first pass retention was determined and reported in Table IV below as percentage of total pulp used.

TABLE IV

| | Percent First Pass Retention | | | |
|---|---|---|---|---|
| | Blank | Add on Level | | |
| pH | 0.00 | 0.05 | 0.10 | 0.30 |
| 5 | 47 | 77 | 75 | 75 |
| 6.5 | 45 | 73 | 82 | 88 |
| 7.5 | 40 | 79 | 87 | 87 |
| 8.4 | 52 | 86 | 93 | 97 |

The above test results clearly shows that products formed according to the present invention as described herein have good retention capabilities over a wide pH range and perform equal to or better than a highly regarded commercial product.

For comparative purposes, several products were prepared essentially according to the procedures taught in U.S. Pat. No. 4,250,299. These products were formed under aqueous conditions and at temperatures which are believed not to cause transamidation to occur in manners described below:

Several samples were formed in a manner by which both the polyamidoamine and the polyamine were reacted simultaneously with epichlorohydrin. These samples (Samples 1-4) were formed using varying ratios of a polyamidoamine (from adipic acid and diethylene triamine in 1:1 molar ratio according to the procedure of Polyamidoamine (A) above) and a commercially obtained polyamine, tetraethylenpentamine. The polyamidoamine was introduced into a reaction vessel with a small amount of water to form an aqueous solution. The polyamine and the remainder of sufficient water to form a 20 percent by weight solution based on the combined polyamidoamine and polyamine were introduced at 25° C. while stirring. Epichlorohydrin was added incrementally while incrementally raising the temperature from 25° C. to 70° C. The reaction was run at 70° C. for 3.5 hours. The samples were each analyzed by gel permeation chromatography to determine number average ($M_n$) and weight average ($M_w$) molecular weight and for molecular weight distribution.

Also for comparative purposes, a sample (Sample 5) was prepared from the same polyamidamine, polyamine and epichlorohydrin as above except that it was reacted sequentially. The polyamidoamine, as a 20 weight percent aqueous solution, was initially contacted with epihalohydrin (epi/polyamidoamine = ⅓ molar ratio at 25° C. for 2.5 hours). The resultant prepolymer was reacted with the polyamine (polyamine/polyamidoamine of 1:3 by weight) as a 20 percent aqueous solution, at a reduced pH using acetic acid (HAC to polyamidoamine molar ratio of 1:1). The mixture was heated to 70° C. for 5 hours and then the pH was increased in 4 one hour increments using NaOH while maintaining the temperature at 70° C. The mixture was then heated for an additional hour at 60° C. The formed polymeric material was then reacted with an epihalohydrin by adding epichlorohydrin in three increments of 0.09, 0.005 and 0.005 by weight based on total polyamidoamine/polyamine present. Each increment was followed by heating for 1 hour at 60° C. The resultant product was analyzed by gel permeation chromatography in the same manner as described above. The results of the molecular weight analysis of Samples 1 to 5 are given in Table V below. In addition, the molecular weight data of Sample PAAPA-1 of Table II is repeated in Table V for comparative purposes. It can be clearly seen that each of Samples 1 to 5 is high in percentage of low molecular weight product while Sample PAAPA-1 of the present invention has much less (about 1/3) low molecular weight material. Also the PAAPA-1 product of the present invention has a much higher content of high molecular weight material than any of the products of Samples 1-5.

TABLE V

| Sample | TEPA/PAA (weight ratio) | EPI/TEPA-PAA (weight ratio) | $M_n$ (g/mol) | $M_w$ (g/mol) | $>3.7 \times 10^6$ | $10^5-3.7 \times 10^6$ | $10^4-10^5$ | $10^3-10^4$ | $<10^3$ |
|---|---|---|---|---|---|---|---|---|---|
| 1 | 1:7 | 0.08:1 | 900 | $6 \times 10^5$ | 5 | 16 | 24 | 26 | 28 |
| 2 | 1:3 | 0.14:1 | 800 | $1.3 \times 10^6$ | 13 | 19 | 14 | 22 | 32 |
| 3 | 1:3 | 0.14:1 | 800 | $1.5 \times 10^6$ | 15 | 19 | 13 | 21 | 31 |
| 4 | 3:5 | 0.22:1 | 700 | $1.3 \times 10^6$ | 13 | 18 | 13 | 21 | 35 |
| 5 | 1:3 | 0.14:1 | 700 | $2.3 \times 10^6$ | 21 | 18 | 12 | 19 | 30 |
| PAAPA-1 | | | 3000 | $7 \times 10^6$ | 25 | 21 | 17 | 26 | 10 |

Representative samples of Table V above were tested for retention properties and compared with the product PAAPA-1 formed as described above according to the subject invention and further compared with two commercially obtained cross-linked polyethyleneimine grafted polyamidoamines retention aids which were labeled PAAPEI-SN and PAAPEI-SK. The retention test was conducted according to that described for the materials of Table IV. The pH was 7.5 and the add on level was 1 kg. per ton of pulp. The results are given in Table VI below.

TABLE VI

| Sample | First Pass Retention-F Percent |
|---|---|
| Blank | 46 |
| 2 (TABLE V) | 75.2 |
| 5 (TABLE V) | 82.1 |
| PAAPEI-SN | 86.5 |
| PAAPEI-SK | 88.2 |
| PAAPA-1 | 86.9 |

PAAPA-1 exhibited a very high percentage of retention capability. This sample was shown to be equivalent to the SN and SK material and was superior (a difference of 3 percentage points or greater is a significant difference on this test) to the Samples 2 and 5 of Table V.

Samples in Table V were also tested as a retention aid by standard technique using a Dynamic Drainage Jar by taking a 50 ml sample of the drain water, evaporating to dryness and weighting constant weight of residue pulp obtained and compared with a material PAAPEI-SK, shown above to be equivalent to the product PAAPA-1 of the present invention. The pulp was formed from 100% waste paper and corrugated board at a pH of 7.7. The results are given in Table VII below.

TABLE VII

| Sample | Solid Content in Drained Water mg per 50 ml water | | |
|---|---|---|---|
|  | 2.5 kg/ton pulp | 5.0 kg/ton pulp | 7.5 kg/ton pulp |
| 1 | 63.0 | 56.0 | 44.0 |
| 2 | 66.0 | 51.0 | 48.0 |
| 3 | 68.0 | 54.0 | 52.0 |
| 4 | 78.0 | 59.0 | 42.0 |
| 5 | — | 42.0 | — |
| PAAPEI-SK | 52 | 27.5 | 27.5 |

Samples 1 to 5 each exhibited inferior retention properties (lower value is better) to an equivalent product of PAAPA-1 of the present invention.

In order to further illustrate that the presence of large percentages of low molecular weight product detrimentally influences the retention properties of the overall product, a material was formed according to the procedure for forming Samples 1 to 4 above using 67 parts polyamidoamine and 20 parts tetraethylenepentamine in 284 parts water and adding 11.75 parts epichlorohydrin under reaction conditions to cause the product to be of lower molecular weight. The product was formed from 1:3 weight ratio of TEPA/PAA and had a $M_w$ of $5 \times 10^5$ and $M_n$ of 600 with a distribution of: 0% for $3.7 \times 10^6$, 8% for $10^5 - 3.7 \times 10^6$, 19% for $10^4 - 10^5$, 31% for $10^3 - 10^4$ and 41% for 10hu 3. The product was tested for retention properties in the same manner as for Sample 1-5 above (Table VII) and exhibited extremely poor properties of solid content remaining in drained water of 80 mg/50 ml $H_2O$ (at 2.5 kg/ton), 74 mg/50 ml $H_2O$ (at 5 kg/ton) and 72 mg/50 ml $H_2O$ (at 7.5 kg/ton).

It is believed that products of the present invention are capable of exhibiting good retention and drainage properties because the polyamine is made a part, by transamidation, of the polyamidoamine polymer chain and that the resultant transamidation product thus competes to a much lesser extent with low molecular weight materials in the reaction with polyfunctional agents. The resultant product is thus low in low molecular weight material which material is believed to detract from the effectiveness of the product.

What is claimed is:

1. A water-soluble polyamidoaminepolyamine having a weight average molecular weight of at least $5 \times 10^5$ with low amounts of low molecular weight material therein formed by first reacting in a reaction zone under substantially nahydrous conditions and at elevated temperatures of at least 150° C.

(A) at least one water soluble or water dispersible polyamidoamine prepared by the condensation of
  (a) at least one aliphatic, cycloaliphatic or araliphatic polyamine having at least two primary amino groups and at least one secondary or tertiary/amino group or a mixture of said polyamine with at least one aliphatic, cycloaliphatic, araliphatic or heterocyclic polyamine containing two primary or two amino groups, each selected from primary or secondary amion groups, and
  (b) at least one $C_4-C_{10}$ aliphatic dicarboxylic acid or with an amide forming derivative thereof; with (B) a water soluble low molecular weight polyamine selected from (a) poly ($C_2-C_3$ alkylenepolyamines having at least two primary amino groups and a molecular weight of from about 150 to 3,000 or (b) reaction products of a low molecular weight amine selected from ammonia, a monoalkyl monoamine, a $C_2-C_3$ polyalkylene diamine, triamine, tetramine or pentamine with a polyfunctional compound selected from epihalohydrin or alpha, omega-dihaloalkane, said amine to polyfunctional compound being reacted in amounts such that the ration of amino nitrogen atom to polyfunctional compound is from about 0.5:1 to 30:1, the resultant reaction product has at least two primary amino groups and has a weight average molecular weight of from about 150 to 3,000.

and subsequantly reaction the polymeric product of (A) and (B) with (C) a compound which is polyfunctional with respect to amino groups contained in the product of (A) and (B) in an amount to produce a polyamidoaminepolyamine having a weight average molecular weight of at least about $5 \times 10^5$.

2. The polyamidoaminepolyamine of claim 1 wherein the polymeric product of (A) and (B) is formed under substantially anhydrous conditions, at a temperature of at least 160° C. and from polyamidoamine (A) and polyamine (B) in a molar ratio of from about 3:1 to 10:1.

3. The polyamidoaminepolyamine of claim 1 wherein the polyamidoamine is prepared by the condensation of an aliphatic polyamine with an aliphatic saturated dicarboxylic acid and the polyamidoamine (A) and polyamine (B) are contacted in a molar ratio of from about 3:1 to 6:1.

4. The polyamidoaminepolyamine of claim 2 wherein the polyamidoamine is prepared by the condensation of an aliphatic polyamine with an aliphatic saturated dicarboxylic acid and the polyamidoamine (A) and polyamine (B) are contacted in a molar ratio of from about 3:1 to 6:1.

5. The polyamidoaminepolyamine of claim 1 wherein the polyfunctional compound (C) is selected from alpha, omega-dihaloalkanes, epihalohydrins or diglycidyl ethers of polyalkylene oxides.

6. The polyamidoaminepolyamine of claim 2 wherein the polyfunctional compound (C) is selected from alpha, omega-dihaloalkanes, epihalohydrins or diglycidyl ethers of polyalklene oxides.

7. The polyamidoaminepolyamine of claim 3 wherein the polyfunctional compound (C) is selected from alpha, omega-dihaloalkanes, epihalohydrins or diglycidyl ethers of polyalkylene oxides.

8. The polyamidoaminepolyamine of claim 4 wherein the polyfunctional compound (C) is selected from alpha, omega-dihaloalkanes, epihalohydrins or diglycidyl ethers of polyalkylene oxides.

9. The polyamidoaminepolyamine of claim 1 wherein the polyamidoamine is prepared by the condensation of (a) a polyamine of the formula

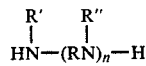

wherein R represents a $C_2$-$C_3$ alkylene group, R' and R" each independently represent hydrogen or a $C_1$-$C_{10}$ alky group and n represents an integer of from 1 to 5, with (b) a $C_4$-$C_8$ saturated aliphatic dicarboxylic acid in a molar ratio of 0.8:1 to 1.5:1;
the polyamine B is a reaction product of an amine selected from diethylene triamine, triethylene tetramine or tetraethylenepentamine or epihalohydrin in amounts such that the ratio of amino nitrogen to moles of epihalohydrin is from about 2:1 to 20:1; and
the polyfunctional compound C is selected from epichlorohydrin or diglycidyl ethers of polyethylene oxide.

10. The polyamidoaminepolyamine of claim 2 wherein the polyamidoamine is prepared by the condensation of (a) a polyamine of the formula

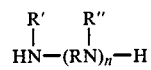

wherein R represents a $C_2$-$C_3$ alkylene group, R' and R" each independently represent hydrogen or a $C_1$-$C_{10}$ alky group and n represents an integer of from 1 to 5, with (b) a $C_4$-$C_8$ saturated aliphatic dicarboxylic acid in a molar ratio of 0.8:1 to 1.5:1;
the polyamine B is a reaction product of an amine selected from diethylene triamine, triethylene tetramine or tetraethylenepentamine or epihalohydrin in amounts such that the ratio of amino nitrogen to moles of epihalohydrin is from about 2:1 to 20:1; and
the polyfunctional compound C is selected from epichlorohydrin or diglycidyl ethers of polyethylene oxide.

11. The polyamidoaminepolyamine of claim 3 wherein the polyamidoamine is prepared by the condensation of (a) a polyamine of the formula

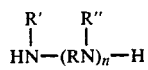

wherein R represents a $C_2$-$C_3$ alkylene group, R' and R" each independently represent hydrogen or a $C_1$-$C_{10}$ alky group and n represents an integer of from 1 to 5, with (b) a $C_4$-$C_8$ saturated aliphatic dicarboxylic acid in a molar ratio of 0.8:1 to 1.5:1;
the polyamine B is a reaction product of an amine selected from diethylene triamine, triethylene tetramine or tetraethylenepentamine and epihalohydrin in amounts such that the ratio of amino nitrogen to moles of epihalohydrin is from about 2:1 to 20:1; and
the polyfunctional compound C is selected from epichlorohydrin or diglycidyl ethers of polyethylene oxide.

12. The polyamidoaminepolyamine of claim 4 wherein the polyamidoamine is prepared by the condensation of (a) a polyamine of the formula

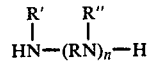

wherein R represents a $C_2$-$C_3$ alkylene group, R' and R" each independently represent hydrogen or a $C_1$-$C_{10}$ alky group and n represents an integer of from 1 to 5, with (b) a $C_4$-$C_8$ saturated aliphatic dicarboxylic acid in a molar ratio of 0.8:1 to 1.5:1;
the polyamine B is a reaction product of an amine selected from diethylene triamine, triethylene tetramine or tetraethylenepentamine or epihalohydrin in amounts such that the ratio of amino nitrogen to moles of epihalohydrin is from about 2:1 to 20:1; and
the polyfunctional compound C is selected from epichlorohydrin or diglycidyl ethers of polyethylene oxide.

13. The polyamidoaminepolyamine of claim 9 wherein the polyamidoamine is the condensation product of a $C_3$-$C_5$ alpha, omega-dicarboxylic acid with diethylenetriamine or triethylenetetramine;
the polyamine B is the product of an amine selected from the group consisting of diethylenetriamine, triethylenetetramine and tetraethylenepentamine with epichlorohydrin at a molar ratio of about 2:1;

the polyamidoamine A and the polyamine B are reacted at a temperature of at least 160° C. under substantially anhydrous conditions and for a time to produce product AB and product AB is reacted with epichlorohydrin or diglycidyl ether of polyethylene oxide in amounts to provide a polyamidoaminepolyamine product of a weight average molecular weight of at least $5 \times 10^5$.

14. The polyamidoaminepolyamine of claim 10 wherein the polyamidoamine is the condensation product of a $C_3-C_5$ alpha, omega-dicarboxylic acid with diethylenetriamine or triethylenetetramine;

the polyamine B is the product of an amine selected from the group consisting of diethylenetriamine, triethylenetetramine and tetraethylenepentamine with epichlorohydrin at a molar ratio of about 2:1;

the polyamidoamine A and the polyamine B are reacted at a temperature of at least 160° C. under substantially anhydrous conditions and for a time to produce product AB and product AB is reacted with epichlorohydrin or diglycidyl ether of polyethylene oxide in amounts to provide a polyamidoaminepolyamine product of a weight average molecular weight of at least $5 \times 10^5$.

15. The polyamidoaminepolyamine of claim 11 wherein the polyamidoamine is the condensation product of a $C_3-C_5$ alpha, omega-dicarboxylic acid with diethylenetriamine or triethylenetetramine;

the polyamine B is the product of an amine selected from the group consisting of diethylenetriamine, triethylenetetramine and tetraethylenepentamine with epichlorohydrin at a molar ratio of about 2:1;

the polyamidoamine A and the polyamine B are reacted at a temperature of at least 160° C. under substantially anhydrous conditions and for a time to produce product AB and product AB is reacted with epichlorohydrin or diglycidyl ether of polyethylene oxide in amounts to provide a polyamidoaminepolyamine product of a weight average molecular weight of at least $5 \times 10^5$.

16. The polyamidoaminepolyamine of claim 12 wherein the polyamidoamine is the condensation product of a $C_3-C_5$ alpha, omega-dicarboxylic acid with diethylenetriamine or triethylenetetramine;

the polyamine B is the product of an amine selected from the group consisting of diethylenetriamine, triethylenetetramine and tetraethylenepentamine with epichlorohydrin at a molar ratio of about 2:1;

the polyamidoamine A and the polyamine B are reacted at a temperature of at least 160° C. under substantially anhydrous conditions and for a time to produce product AB and product AB is reacted with epichlorohydrin or diglycidyl ether of polyethylene oxide in amounts to provide a polyamidoaminepolyamine product of a weight average molecular weight of at least $5 \times 10^5$.

17. The product of claim 1 wherein the resultant polyamidoaminepolyamine product is substantially absent of product having a weight average molecular weight of less than $10^5$.

18. The product of claim 9 wherein the resultant polyamidoaminepolyamine product is substantially absent of product having a weight average molecular weight of less than $10^5$.

19. The product of claim 1 wherein the resultant polyamidoaminepolyamine has a weight average molecular weight of at least about $10^6$ with low amounts of low molecular weight material therein.

20. The product of claim 9 wherein the resultant polyamidoaminepolyamine has a weight average molecular weight of at least about $10^6$ with low amounts of low molecular weight material therein.

21. The product of claim 13 wherein the resultant polyamidoaminepolyamine has a weight average molecular weight of at least about $10^6$ with low amounts of low molecular weight material therein.

* * * * *